United States Patent
Hirosawa

(10) Patent No.: US 10,353,259 B2
(45) Date of Patent: Jul. 16, 2019

(54) LIQUID CRYSTAL DISPLAY DEVICE AND DISPLAY DEVICE

(71) Applicant: Japan Display Inc., Minato-ku (JP)

(72) Inventor: Jin Hirosawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/679,913

(22) Filed: Aug. 17, 2017

(65) Prior Publication Data

US 2017/0343878 A1 Nov. 30, 2017

Related U.S. Application Data

(63) Continuation of application No. 14/848,943, filed on Sep. 9, 2015, now Pat. No. 9,791,757.

(30) Foreign Application Priority Data

Sep. 9, 2014 (JP) ................................. 2014-183019

(51) Int. Cl.
*G02F 1/1362* (2006.01)
*G02F 1/1333* (2006.01)
(Continued)

(52) U.S. Cl.
CPC ...... *G02F 1/136286* (2013.01); *G02F 1/1335* (2013.01); *G02F 1/133345* (2013.01); *G02F 1/136227* (2013.01); *G02F 1/135* (2013.01); *G02F 1/1337* (2013.01); *G02F 1/136213* (2013.01); *G02F 1/136277* (2013.01);
(Continued)

(58) Field of Classification Search
CPC ......... G02F 1/136286; G02F 1/136227; G02F 1/1335; G02F 1/133345; G02F 1/136277; G02F 2001/136245; G02F 2001/1555; G02F 2001/1357; G02F 1/135; G02F 2001/1557; G02F 2001/133357;
(Continued)

(56) References Cited

U.S. PATENT DOCUMENTS 6,233,034 B1 5/2001 Lee
6,266,116 B1 7/2001 Ohta et al.
(Continued)

FOREIGN PATENT DOCUMENTS

CN 101122694 A 2/2008
CN 101344697 A 1/2009
(Continued)

OTHER PUBLICATIONS

Combined Office Action and Search Report dated Jan. 19, 2018 in Chinese Patent Application No. 201510566173.4 with English translation, 13 pages.

*Primary Examiner* — Hoan C Nguyen
(74) *Attorney, Agent, or Firm* — Oblon, McClelland, Maier & Neustadt, L.L.P.

(57) ABSTRACT

According to one embodiment, a liquid crystal display device includes a first substrate including a semiconductor layer including a first extension portion and a second extension portion, a gate line, a first common electrode opposed to at least the second extension portion, a source line extending above the second extension portion, a pixel electrode including a main pixel electrode, a second common electrode including a second main common electrode opposed to the source line, and a first alignment film.

16 Claims, 10 Drawing Sheets

(51) Int. Cl.
*G02F 1/1335* (2006.01)
*G02F 1/1337* (2006.01)
*G02F 1/135* (2006.01)
*G02F 1/155* (2006.01)
*G02F 1/1343* (2006.01)
*G02F 1/136* (2006.01)

(52) U.S. Cl.
CPC .............. *G02F 2001/1357* (2013.01); *G02F 2001/13606* (2013.01); *G02F 2001/133357* (2013.01); *G02F 2001/134318* (2013.01); *G02F 2001/136245* (2013.01); *G02F 2001/1555* (2013.01); *G02F 2001/1557* (2013.01)

(58) Field of Classification Search
CPC .......... G02F 2001/13606; G02F 2001/134318; G02F 1/136213; G02F 1/1337
USPC .................................................. 349/139, 141
See application file for complete search history.

(56) References Cited

U.S. PATENT DOCUMENTS

| | | | |
|---|---|---|---|
| 9,316,872 | B2 | 4/2016 | Hirosawa |
| 2001/0010575 | A1 | 8/2001 | Yoshida et al. |
| 2003/0020853 | A1 | 1/2003 | Park |
| 2004/0164297 | A1 | 8/2004 | Kaneko |
| 2004/0165136 | A1 | 8/2004 | Sugiyama et al. |
| 2005/0162893 | A1 | 7/2005 | Yagi et al. |
| 2005/0206824 | A1 | 9/2005 | Son et al. |
| 2005/0219453 | A1 | 10/2005 | Kubo et al. |
| 2007/0115234 | A1 | 5/2007 | Kim et al. |
| 2008/0062358 | A1 | 3/2008 | Lee et al. |
| 2008/0180590 | A1 | 7/2008 | Lee et al. |
| 2008/0180623 | A1 | 7/2008 | Lee et al. |
| 2008/0186439 | A1 | 8/2008 | Kwon et al. |
| 2008/0309841 | A1 | 12/2008 | Yagi et al. |
| 2010/0060814 | A1 | 3/2010 | Harada |
| 2011/0025937 | A1 | 2/2011 | Yagi et al. |
| 2011/0234947 | A1 | 9/2011 | Hirosawa |
| 2013/0265515 | A1 | 10/2013 | Hasegawa et al. |
| 2013/0278852 | A1 | 10/2013 | Yamamoto et al. |
| 2013/0329156 | A1 | 12/2013 | Hirosawa |
| 2015/0092146 | A1 | 4/2015 | Hirosawa |
| 2015/0098042 | A1 | 4/2015 | Hirosawa |

FOREIGN PATENT DOCUMENTS

| | | |
|---|---|---|
| CN | 102881688 A | 1/2013 |
| JP | 6-222397 | 8/1994 |
| JP | 7-159807 | 6/1995 |
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 5/2005 |
| JP | 2005-242307 | 9/2005 |
| JP | 2007003903 A * | 1/2007 |
| JP | 2011-209454 | 10/2011 |
| JP | 2013-254052 | 12/2013 |

* cited by examiner

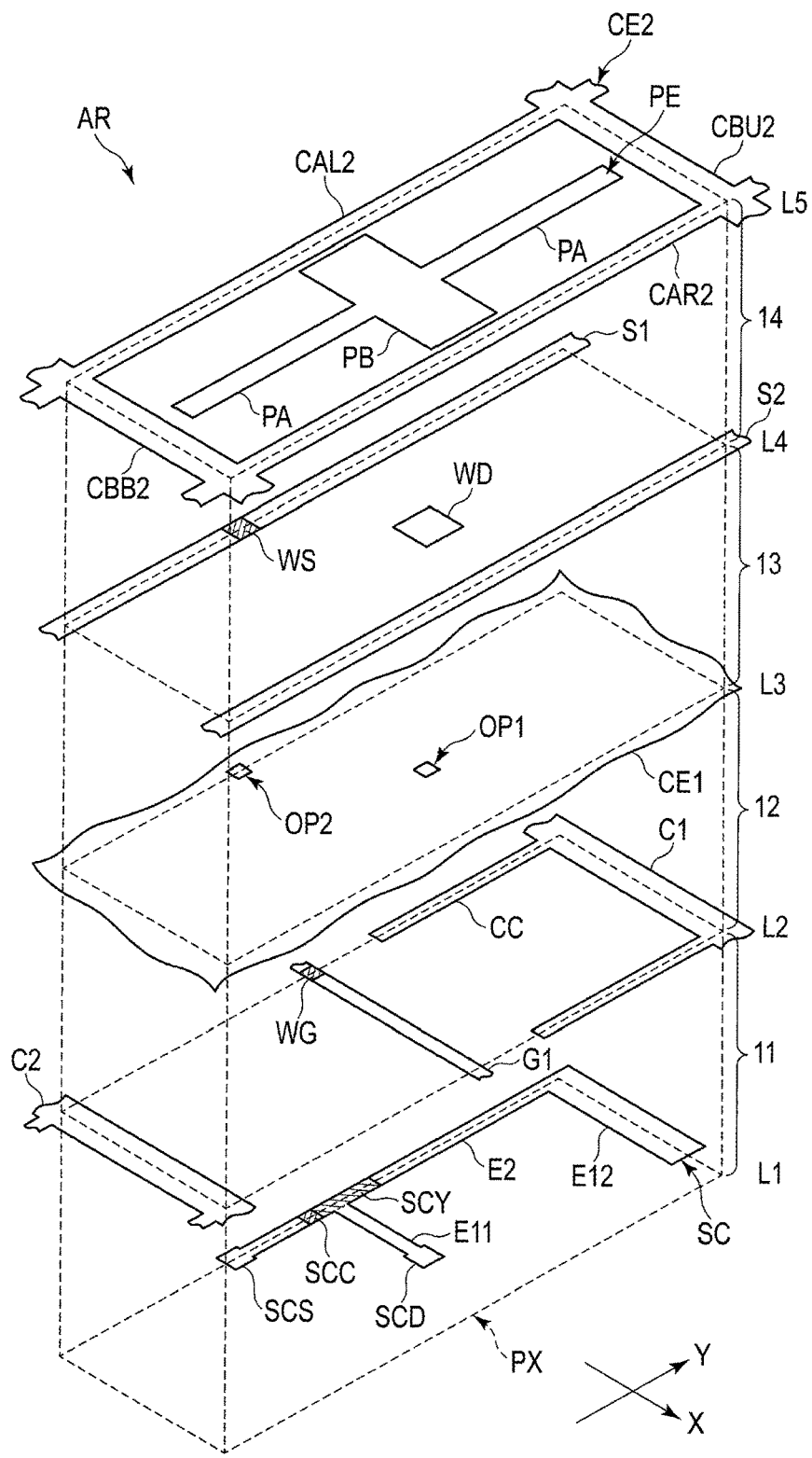
F I G. 3

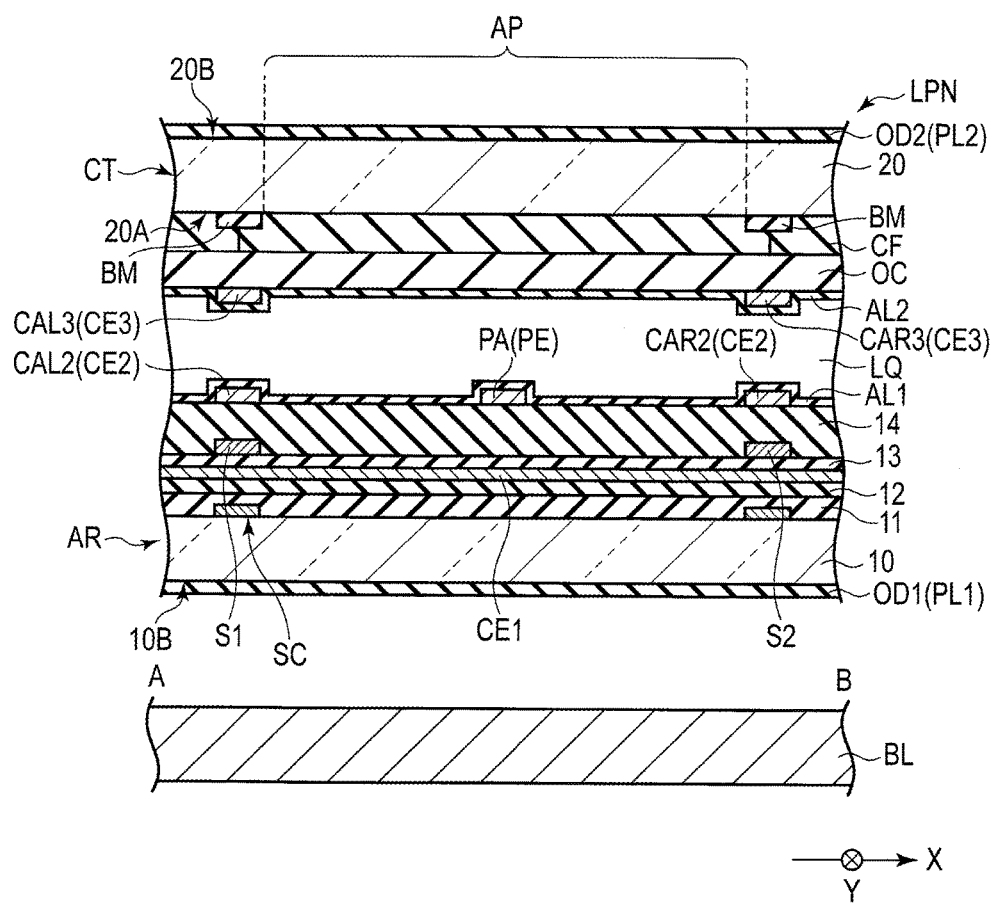
F I G. 5

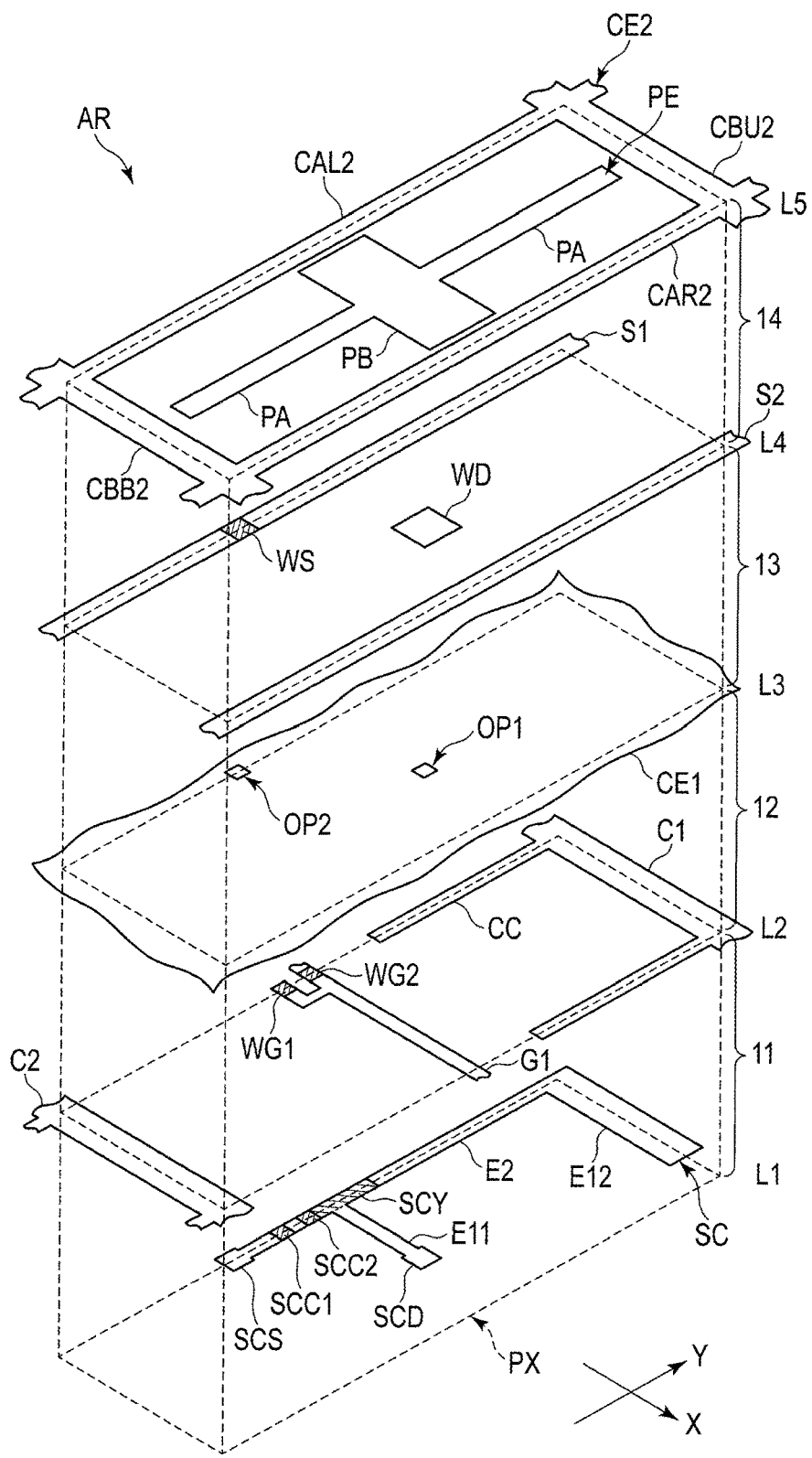
F I G. 10

LIQUID CRYSTAL DISPLAY DEVICE AND DISPLAY DEVICE

CROSS-REFERENCE TO RELATED APPLICATIONS

This application is a continuation of U.S. application Ser. No. 14/848,943 filed Sep. 9, 2015, and is based upon and claims the benefit of priority from Japanese Patent Application No. 2014-183019, filed Sep. 9, 2014, the entire contents of each of which are incorporated herein by reference.

FIELD

Embodiments described herein relate generally to a liquid crystal display device and a display device.

BACKGROUND

In recent years, there has been proposed a technique in which, in an active-matrix-type liquid crystal display device including a switching element in each pixel, a lateral electric field or an oblique electric field is produced between a pixel electrode, which is formed on an array substrate, and a common electrode, which is formed on a counter-substrate, thereby controlling alignment of liquid crystal molecules. In particular, there has been proposed a technique in which a pixel electrode of a two-layer structure is disposed between neighboring source lines, thereby reducing the effect of a leak electric field from the source lines.

BRIEF DESCRIPTION OF THE DRAWINGS

FIG. 3 is an exploded view which schematically illustrates a main layer structure constituting the array substrate AR shown in FIG. 2.

FIG. 5 is a cross-sectional view, taken along line A-B in FIG. 4, which schematically illustrates a cross-sectional structure of a liquid crystal display panel LPN.

FIG. 10 is an exploded view which schematically illustrates a main layer structure constituting the array substrate AR shown in FIG. 9.

DETAILED DESCRIPTION

Figure 1:
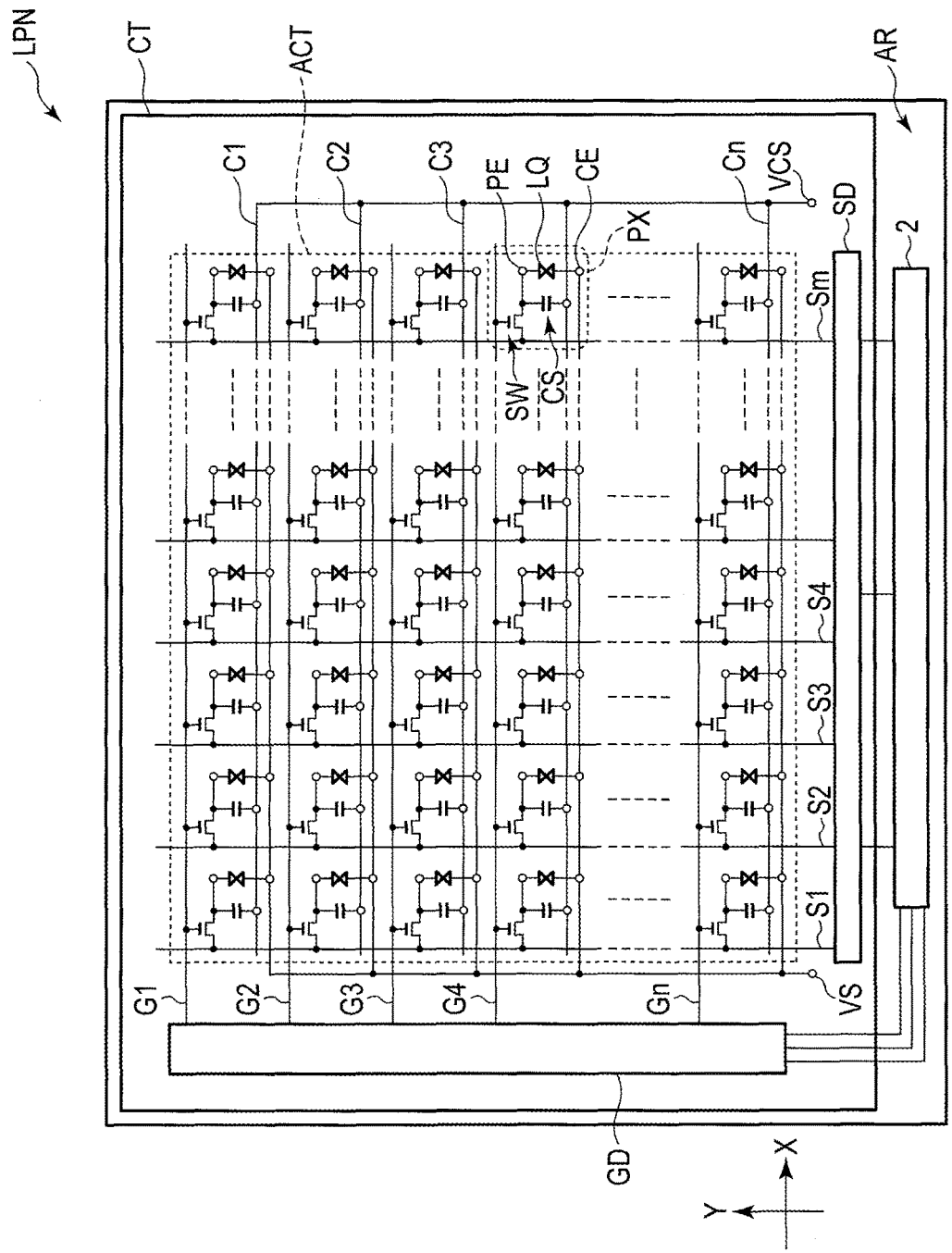
FIG. 1 is a view which schematically illustrates a structure and an equivalent circuit of a liquid crystal display device according to an embodiment.

In general, according to one embodiment, a liquid crystal display device includes: a first substrate including a semiconductor layer including a first extension portion extending in a first direction and a second extension portion extending in a second direction crossing the first direction, a first insulation film covering the semiconductor layer, a gate line extending above the first insulation film in the first direction and crossing the second extension portion, a second insulation film covering the gate line, a first common electrode formed above the second insulation film and opposed to at least the second extension portion of the semiconductor layer, a third insulation film covering the first common electrode, a source line extending above the third insulation film in the second direction and extending above the second extension portion, a fourth insulation film covering the source line, a pixel electrode including a main pixel electrode extending above the fourth insulation film in the second direction, a second common electrode which includes a second main common electrode extending above the fourth insulation film in the second direction and opposed to the source line, and has the same potential as the first common electrode, and a first alignment film covering the pixel electrode and the second common electrode; a second substrate including a second alignment film opposed to the first alignment film; and a liquid crystal layer held between the first substrate and the second substrate.

According to another embodiment, a display device includes: a first substrate including a semiconductor layer, a first insulation film covering the semiconductor layer, a gate line extending above the first insulation film in a first direction, a second insulation film covering the gate line, a first transparent electrode formed above the second insulation film, a third insulation film covering the first transparent electrode, a source line extending above the third insulation film in a second direction, a fourth insulation film covering the source line, and a second transparent electrode formed above the fourth insulation film; and a second substrate opposed to the first substrate, wherein the first transparent electrode is opposed to the source line and extends in the first direction, and is opposed to the gate line and extends in the second direction.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

FIG. 1 is a view which schematically illustrates a structure and an equivalent circuit of a liquid crystal display device according to an embodiment.

The liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT is composed of a plurality of pixels PX which are arrayed in a matrix.

The liquid crystal display panel LPN includes, in the active area ACT, a plurality of gate lines G (G1 to Gn), a plurality of storage capacitance lines C (C1 to Cn), and a plurality of source lines S (S1 to Sm). The gate lines G and storage capacitance lines C extend, for example, substantially linearly in a first direction X. The gate lines G and storage capacitance lines C neighbor at intervals in a second direction Y crossing the first direction X, and are alternately arranged in parallel. In this example, the first direction X and the second direction Y are perpendicular to each other. The source lines S extend substantially linearly in the second direction Y, and cross the gate lines G and storage capacitance lines C. In the meantime, the gate lines G, storage capacitance lines C and source lines S may not necessarily extend linearly, and portions thereof may be bent.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR. The gate driver GD and source driver SD are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE (or a semiconductor layer having the same potential as the pixel electrode). The storage capacitance line C is electrically connected to a voltage application module VCS to which a storage capacitance voltage is applied.

The switching element SW is composed of, for example, an n-channel thin-film transistor (TFT). The switching element SW is electrically connected to the gate line G and source line S. The switching element SW may be of a top gate type or a bottom gate type.

The pixel electrodes PE are disposed in the respective pixels PX, and are electrically connected to the switching elements SW. The common electrode CE has, for example, a common potential, and is disposed common to pixel electrodes PE of a plurality of pixels PX via the liquid crystal layer LQ. A power supply module VS is formed, for example, on the outside of the active area ACT on the array substrate AR. The common electrode CE is led out to the outside of the active area ACT, and is electrically connected to the power supply module VS.

In the present embodiment, the liquid crystal display panel LPN is configured such that the pixel electrodes PE are formed on the array substrate AR, and at least a part of the common electrode CE is formed on the array substrate AR or counter-substrate CT, and the alignment of liquid crystal molecules included in the liquid crystal layer LQ is controlled by mainly using an electric field which is produced between the pixel electrodes PE and the common electrode CE. The electric field, which is produced between the pixel electrodes PE and the common electrode CE, is an electric field slightly inclined to an X-Y plane defined by the first direction X and second direction (or inclined to a substrate major surface) (or is an electric field substantially parallel to the substrate major surface).

Figure 2:
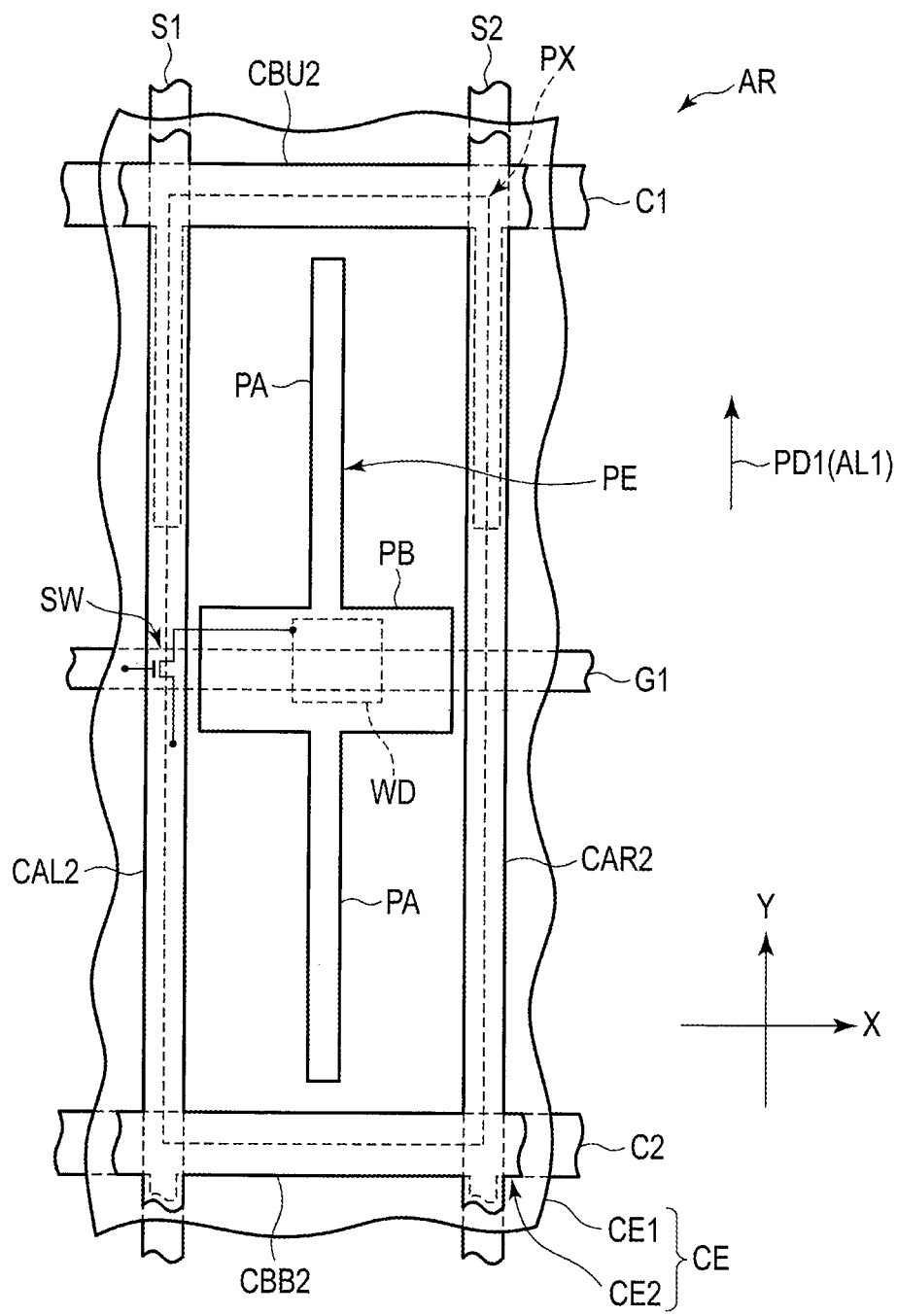
FIG. 2 is a plan view which schematically illustrates a structure example of one pixel PX at a time when an array substrate AR illustrated in FIG. is viewed from a counter-substrate side.

FIG. 2 is a plan view which schematically illustrates a structure example of one pixel PX at a time when the array substrate AR illustrated in FIG. 1 is viewed from the counter-substrate side. FIG. 2 is a plan view in the X-Y plane.

The array substrate AR includes a gate line G1, a storage capacitance line C1, a storage capacitance line C2, a source line S1, a source line S2, a switching element SW, a pixel electrode PE, a first common electrode CE1 and a second common electrode CE2 which are included in the common electrode CE, and a first alignment film AL1.

The storage capacitance line C1 and storage capacitance line C2 are disposed at an interval in the second direction Y, and each of the storage capacitance line C1 and storage capacitance line C2 extends in the first direction X. The gate line G1 is located between the storage capacitance line C1 and storage capacitance line C2, and extends in the first direction X. In the example illustrated, the gate line G1 is located at a substantially middle point between the storage capacitance line C1 and storage capacitance line C2. Specifically, the distance between the gate line C1 and storage capacitance line C1 in the second direction Y is substantially equal to the distance between the gate line G1 and storage capacitance line C2 in the second direction Y. The source line S1 and source line S2 are disposed at an interval in the first direction X, and each of the source line S1 and source line S2 extends in the second direction Y.

In the example illustrated, as indicated by a broken line in FIG. 2, the pixel PX corresponds to a box-shaped area which is defined by the storage capacitance line C1 and storage capacitance line C2 and the source line S1 and source line S2, and has a rectangular shape having a less length in the first direction X than in the second direction Y. The length of the pixel PX in the first direction X corresponds to the pitch between the source line S1 and source line S2 in the first direction X. The length of the pixel PX in the second direction Y corresponds to the pitch between the storage capacitance line C1 and storage capacitance line C2 in the second direction Y.

In the pixel PX illustrated, the source line S1 is located at a left side end portion, and is disposed to extend over a boundary between the pixel PX and a pixel neighboring on the left side. The source line S2 is located at a right side end portion, and is disposed to extend over a boundary between the pixel PX and a pixel neighboring on the right side. The storage capacitance line C1 is located at an upper side end portion, and is disposed to extend over a boundary between the pixel PX and a pixel neighboring on the upper side. The storage capacitance line C2 is located at a lower side end portion, and is disposed to extend over a boundary between the pixel PX and a pixel neighboring on the lower side. The gate line G1 is disposed at a substantially middle portion of the pixel PX.

The switching element SW is electrically connected to the gate line G1 and source line S1. A drain electrode WD of the switching element SW is disposed at a substantially central portion of the pixel PX.

The pixel electrode PE is located between the source line S1 and source line S2, and is located between the neighboring storage capacitance line C1 and storage capacitance line C2. The pixel electrode PE includes a main pixel electrode PA and a sub-pixel electrode PB. The main pixel electrode PA and sub-pixel electrode PB are formed integral or continuous, and are electrically connected to each other. The pixel electrode PE illustrated is formed in a cross shape.

Specifically, the sub-pixel electrode PB crosses the main pixel electrode PA at a middle portion of the main pixel electrode PA.

The main pixel electrode PA is located at a substantially middle point between the source line S1 and source line S2, and linearly extends in the second direction Y to the vicinity of the upper side end portion of the pixel PX (i.e. to the vicinity of the storage capacitance line C1) and to the vicinity of the lower side end portion of the pixel PX (i.e. to the vicinity of the storage capacitance line C2). The main pixel electrode PA is formed in a strip shape having a substantially uniform width in the first direction X. The sub-pixel electrode PB is located at a substantially middle point between the storage capacitance line C1 and storage capacitance line C2, and linearly extends in the first direction X to the vicinity of the left side end portion of the pixel PX (i.e. to the vicinity of the source line S1) and to the vicinity of the right side end portion of the pixel PX (i.e. to the vicinity of the source line S2). The sub-pixel electrode PB is formed in a strip shape having a substantially uniform width in the second direction Y. A part of the sub-pixel electrode PB is disposed at a position overlapping the gate line G1, and the sub-pixel electrode PB overlaps the drain electrode WD and is electrically connected to the switching element SW.

The first common electrode CE1 is opposed to the pixel electrode PE, and is disposed over substantially the entirety of the pixel PX. In addition, the first common electrode CE1 is opposed to the source line S1 and source line S2, extends in the first direction X beyond the source line S1 and source line S2, and is also disposed on pixels neighboring the pixel PX in the first direction X. Besides, the first common electrode CE1 is opposed to the gate line G1, storage capacitance line C1 and storage capacitance line C2, extends in the second direction Y beyond the storage capacitance line C1 and storage capacitance line C2, and is also disposed on pixels neighboring the pixel PX in the second direction Y.

The second common electrode CE2 includes a second main common electrode CAL2 and a second main common electrode CAR2, and a second sub-common electrode CBU2 and a second sub-common electrode CBB2. The second main common electrode CAL2 and second main common electrode CAR2, and the second sub-common electrode CBU2 and second sub-common electrode CBB2 are formed integral or continuous, and are electrically connected to each other. Specifically, the second common electrode CE2 is formed in a grid shape which partitions the pixel PX. The second common electrode CE2 is spaced apart from the pixel electrode PE, and surrounds the pixel electrode PE. The first common electrode CE1 and second common electrode CE2 are electrically connected to each other, have the same potential, and are connected to the power supply module VS on the outside of the active area ACT.

Each of the second main common electrode CAL2 and second main common electrode CAR2 linearly extends in the second direction Y, and is formed in a strip shape having a substantially uniform width in the first direction X. In the example illustrated, the second main common electrode CAL2 is located at a left side end portion of the pixel PX, is disposed to extend over a boundary between the pixel PX and a pixel neighboring on the left side, and is opposed to the source line S1. The second main common electrode CAR2 is located at a right side end portion of the pixel PX, is disposed to extend over a boundary between the pixel PX and a pixel neighboring on the right side, and is opposed to the source line S2.

Each of the second sub-common electrode CBU2 and second sub-common electrode CBB2 linearly extends in the first direction X, and is formed in a strip shape having a substantially uniform width in the second direction Y. In the example illustrated, the second sub-common electrode CBU2 is located at an upper side end portion of the pixel PX above the storage capacitance line C1, and is disposed to extend over a boundary between the pixel PX and a pixel neighboring on the upper side. The second sub-common electrode CBB2 is located at a lower side end portion of the pixel PX above the storage capacitance line C2, and is disposed to extend over a boundary between the pixel PX and a pixel neighboring on the lower side.

In the array substrate AR, the pixel electrode PE and second common electrode CE2 are covered with the first alignment film AL1. The first alignment film AL1 is subjected to alignment treatment in a first alignment treatment direction PD1 for initially aligning the liquid crystal molecules of the liquid crystal layer LQ. The first alignment treatment direction PD1 is substantially parallel to the second direction Y.

FIG. 3 is an exploded view which schematically illustrates a main layer structure constituting the array substrate AR shown in FIG. 2. Here, FIG. 3 illustrates main electrically conductive layers in the array substrate AR.

The array substrate AR includes a first layer L1, a second layer L2, a third layer L3, a fourth layer L4 and a fifth layer L5. The array substrate AR also includes a first insulation film 11 lying between the first layer L1 and second layer L2, a second insulation film 12 lying between the second layer L2 and third layer L3, a third insulation film 13 lying between the third layer L3 and fourth layer L4, and a fourth insulation film 14 lying between the fourth layer L4 and fifth layer L5.

The first layer L1 includes a semiconductor layer SC of the switching element. The semiconductor layer SC is formed of, for example, polycrystalline silicon (p-Si), but it may be formed of amorphous silicon (a-Si). The semiconductor layer SC includes first extension portions E11 and E12 extending in the first direction X, and a second extension portion E2 extending in the second direction Y. The second extension portion E2 extends below the source line S1, crosses the gate line G1, and extends toward the storage capacitance line C1. The first extension portion E11 branches from an intermediate part of the second extension portion E2, and extends below the drain electrode WD. The first extension portion E12 is continuous with one end portion of the second extension portion E2, and extends below the storage capacitance line C1. Incidentally, in the semiconductor layer SC, a region located immediately below the gate line G1 corresponds to a channel region SCC, a region on a side of contact with the source line S1, relative to the channel region SCC, corresponds to a source region SCS, and a region on a side of extension below the drain electrode WD, relative to the channel region SCC, corresponds to a drain region SCD. This semiconductor layer SC is covered with the first insulation film 11.

The second layer L2 includes, above the first insulation film 11, the storage capacitance line C1, gate line G1 and storage capacitance line C2. The storage capacitance line C1, storage capacitance line C2 and gate line G1 can be formed of the same wiring material at a time. A main portion of the storage capacitance line C1 extends in the first direction X, and is opposed to the first extension portion E12 via the first insulation film 11. In addition, the storage capacitance line C1 includes a branch portion CC branching from the main portion thereof. The branch portion CC extends in the second direction Y toward the gate line G1, and is opposed to the second extension portion E2 via the first insulation film 11. The gate line G1 extends in the first direction X and crosses the second extension portion E2. That region of the gate line G1, which is located above the semiconductor layer SC, corresponds to a gate electrode WG of the switching element. The storage capacitance line C1, gate line G1 and storage capacitance line C2 are covered with the second insulation film 12.

The third layer L3 includes the first common electrode CE1 above the second insulation film 12. The first common electrode CE1 is formed of a transparent, electrically conductive material such as indium tin oxide (ITO) or indium zinc oxide (IZO). The first common electrode CE1 corresponds to a transparent electrode. The first common electrode CE1 is disposed over substantially the entirety of the pixel PX, and is opposed to the storage capacitance line C1, gate line G1 and storage capacitance line C2. In addition, the first common electrode CE1 is opposed to the semiconductor layer SC between the gate line G1, on one hand, and the storage capacitance line C1 and storage capacitance line C2, on the other hand. Specifically, of the second extension portion E2, the source region SCS and drain region SCD are opposed to the first common electrode CE1. In the first common electrode CE1, an opening portion OP1 is formed at a position opposed to an end portion of the first extension portion E11 in the drain region SCD. In addition, in the first common electrode CE1, an opening portion OP2 is formed at a position opposed to an end portion of the second extension portion E2 in the source region SCS. The first common electrode CE1 is covered with the third insulation film 13.

The fourth layer L4 includes, above the third insulation film 13, the source line S1, source line S2 and drain electrode WD. The source line S1, source line S2 and drain electrode WD can be formed of the same wiring material at a time. The source line S1 and source line S2 extend in the second direction Y. That region of the source line S1, which is in contact with the source region SCS of the semiconductor layer SC, corresponds to a source electrode WS of the switching element. Specifically, the source electrode WS is put in contact with the source region SCS via a contact hole which penetrates the first insulation film 11, second insulation film 12 and third insulation film 13 through the opening portion OP2 of the first common electrode CE1. The drain electrode WD is formed in an island shape between the source line S1 and source line S2. The drain electrode WD is put in contact with the drain region SCD via a contact hole which penetrates the first insulation film 11, second insulation film 12 and third insulation film 13 through the opening portion OP1 of the first common electrode CE1. The source line S1, source line S2 and drain electrode WD are covered with the fourth insulation film 14.

In the present embodiment, although the source line S1 is located above the second extension portion E2 of the semiconductor layer SC, the first common electrode CE1 lies between the source line S1 and a region SCY of the second extension portion E2 on the side of the drain region SCD that is in contact with the pixel electrode PE.

The fifth layer L5 includes, above the fourth insulation film 14, the second common electrode CE2 and pixel electrode PE. The second common electrode CE2 and pixel electrode PE can be formed of the same material at a time, and are formed of a transparent, electrically conductive material such as ITO or IZO. In this case, the second common electrode CE2 corresponds to a transparent electrode. Incidentally, the pixel electrodes PE and second common electrode CE2 may be formed of an opaque wiring material such as aluminum (Al), titanium (Ti), silver (Ag), molybdenum (Mo), tungsten (W), copper (Cu) or chromium (Cr). The second main common electrode CAL2 is located above the source line S1. The second main common electrode CAR2 is located above the source line S2. The second sub-common electrode CBU2 is located above the storage capacitance line C1. The second sub-common electrode CBB2 is located above the storage capacitance line C2. The pixel electrode PE is opposed to the first common electrode CE1 via the third insulation film 13 and fourth insulation film 14. The sub-pixel electrode PB is located above the drain electrode WD, and is put in contact with the drain electrode WD via a contact hole penetrating the fourth insulation film 14. In addition, the sub-pixel electrode PB is opposed to the gate line G1 and first extension portion E11.

Figure 4:
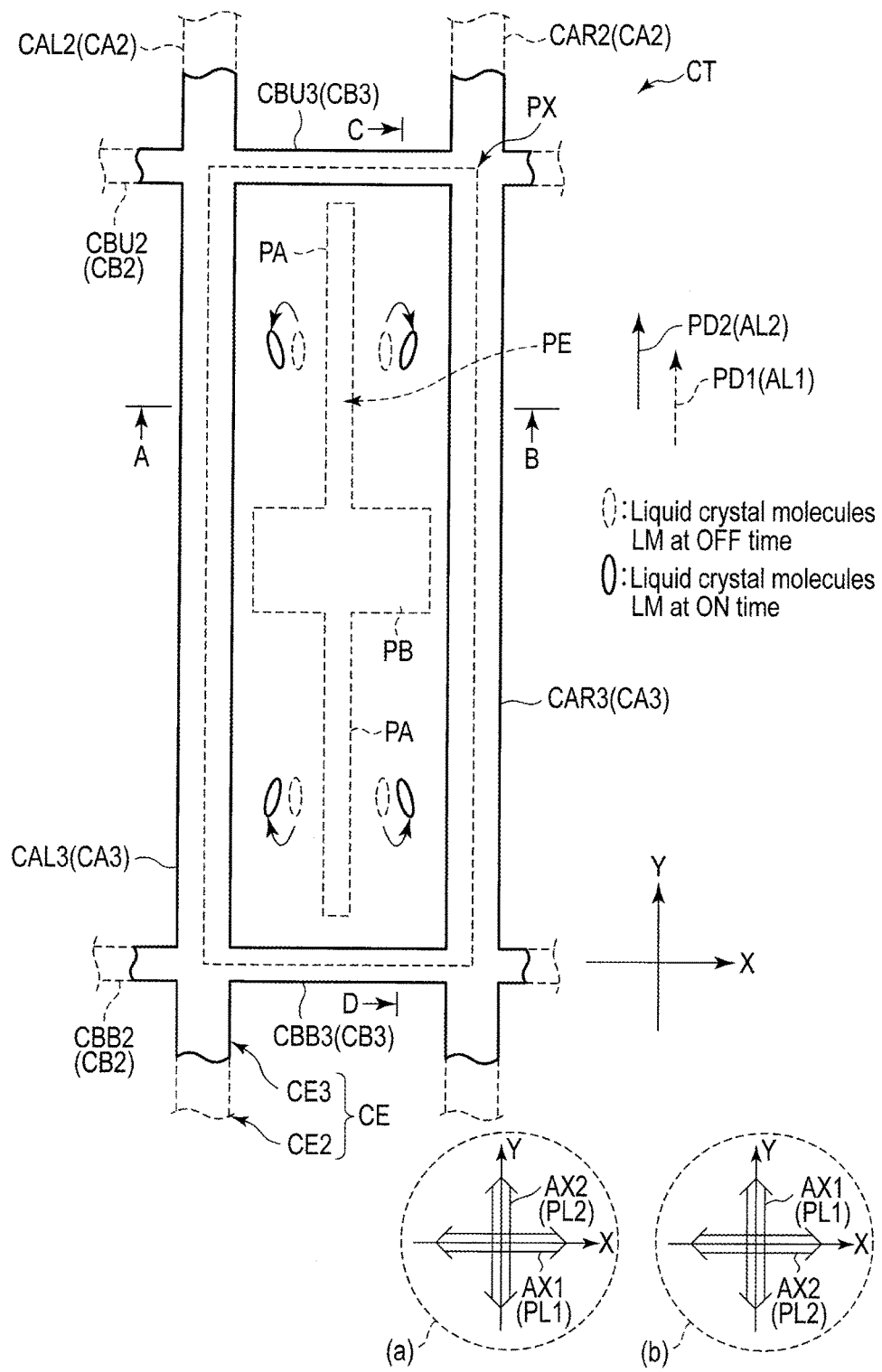
FIG. 4 is a plan view which schematically illustrates a structure example of one pixel PX in a counter-substrate CT shown in FIG. 1.

FIG. 4 is a plan view which schematically illustrates a structure example of one pixel PX in the counter-substrate CT shown in FIG. 1. FIG. 4 is a plan view in the X-Y plane. Here, FIG. 4 illustrates only the structure that is necessary for the description, and only the pixel electrode PE and second common electrode CE2 of the array substrate are shown by broken lines.

The counter-substrate CT includes a third common electrode CE3 which is included in the common electrode CE. The third common electrode CE3 includes a third main common electrodes CAL3 and a third main common electrodes CAR3, and a third sub-common electrode CBU3 and a third sub-common electrode CBB3. The third main common electrodes CAL3 and third main common electrodes CAR3, and the third sub-common electrode CBU3 and third sub-common electrode CBB3 are formed integral or continuous, and are electrically connected to each other. Specifically, the third common electrode CE3 is formed in a grid shape which partitions the pixel PX. The third common electrode CE3 is electrically connected to the first common electrode CE1 and second common electrode CE2, and has the same potential as the first common electrode CE1 and second common electrode CE2.

Each of the third main common electrode CAL3 and third main common electrode CAR3 linearly extends in the second direction Y, and is formed in a strip shape having a substantially uniform width in the first direction X. In the example illustrated, the third main common electrode CAL3 is located at a left side end portion of the pixel PX, is disposed to extend over a boundary between the pixel PX and a pixel neighboring on the left side, and is opposed to the second main common electrode CAL2. The third main common electrode CAR3 is located at a right side end portion of the pixel PX, is disposed to extend over a boundary between the pixel PX and a pixel neighboring on the right side, and is opposed to the second main common electrode CAR2.

Each of the third sub-common electrode CBU3 and third sub-common electrode CBB3 linearly extends in the first direction X, and is formed in a strip shape having a substantially uniform width in the second direction Y. In the example illustrated, the third sub-common electrode CBU3 is located at an upper side end portion of the pixel PX, is disposed to extend over a boundary between the pixel PX and a pixel neighboring on the upper side, and is opposed to the second sub-common electrode CBU2. The third sub-common electrode CBB3 is located at a lower side end portion of the pixel PX, is disposed to extend over a boundary between the pixel PX and a pixel neighboring on the lower side, and is opposed to the second sub-common electrode CBU2.

In the counter-substrate CT, the third common electrode CE3 is covered with a second alignment film AL2. The second alignment film AL2 is subjected to alignment treatment in a second alignment treatment direction PD2 for initially aligning the liquid crystal molecules of the liquid crystal layer LQ. The second alignment treatment direction PD2 is parallel to the first alignment treatment direction PD1. In the example illustrated, the second alignment treatment direction PD2 is identical to the first alignment treatment direction PD1. Incidentally, the first alignment treatment direction PD1 and second alignment treatment direction PD2 may be opposite to each other.

Figure 6:
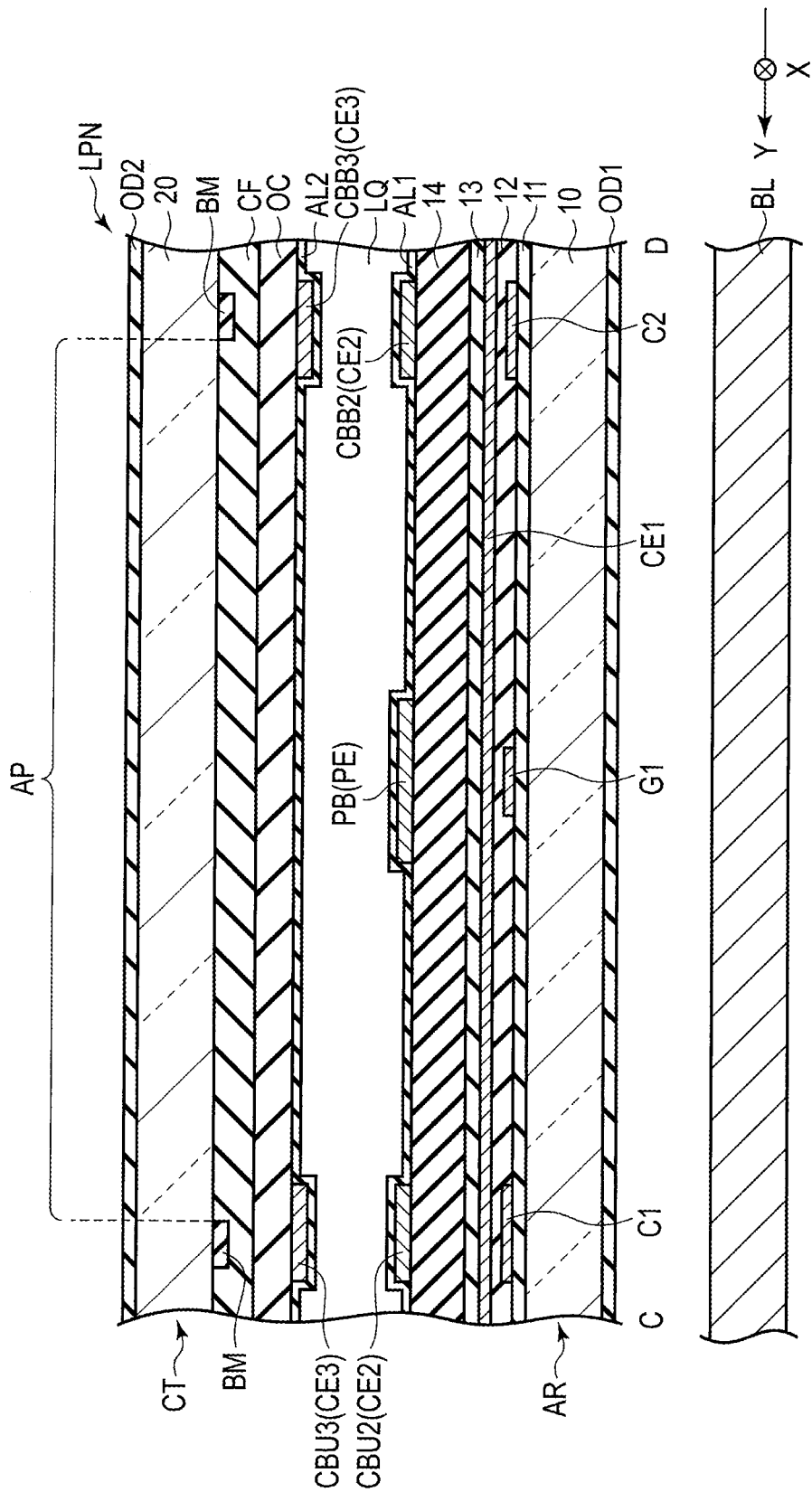
FIG. 6 is a cross-sectional view, taken along line C-D in FIG. 4, which schematically illustrates a cross-sectional structure of the liquid crystal display panel LPN.

FIG. 5 is a cross-sectional view, taken along line A-B in FIG. 4, which schematically illustrates a cross-sectional structure of the liquid crystal display panel LPN. FIG. 6 is a cross-sectional view, taken along line C-D in FIG. 4, which schematically illustrates a cross-sectional structure of the liquid crystal display panel LPN.

A backlight unit BL, which illuminates the liquid crystal display panel LPN, is disposed on the back surface side of the array substrate AR. Various modes are applicable to the backlight unit BL. A description of the detailed structure of the backlight unit BL is omitted here.

The array substrate AR is formed by using a first insulative substrate 10 having light transmissivity. The array substrate AR includes, on the inside of the first insulative substrate 10, that is, on the side facing the counter-substrate CT, a semiconductor layer SC of a switching element, a gate line G1, a storage capacitance line C1, a storage capacitance line C2, a source line S1, a source line S2, a pixel electrode PE, a first common electrode CE1, a second common electrode CE2, a first insulation film 11, a second insulation film 12, a third insulation film 13, a fourth insulation film 14, and a first alignment film AL1.

The semiconductor layer SC is formed on the first insulative substrate 10, and is covered with the first insulation film 11. In the meantime, an insulation film (undercoat layer) may be additionally provided between the semiconductor layer SC and first insulative substrate 10. The storage capacitance line C1, storage capacitance line C2 and gate line G1 are formed on the first insulation film 11, and are covered with the second insulation film 12.

The first common electrode CE1 is formed on the second insulation film 12, and is covered with the third insulation film 13. The first common electrode CE1 is opposed to the semiconductor layer SC via the first insulation film 11 and second insulation film 12, and is also opposed to the gate line G1, storage capacitance line C1 and storage capacitance line C2 via the second insulation film 12.

The source line S1 and source line S2 are formed on the third insulation film 13 and are covered with the fourth insulation film 14. The first common electrode CE1 lies between the semiconductor layers SC, on one hand, and the source line S1 and source line S2, on the other hand.

The above-described first insulation film 11, second insulation film 12 and third insulation film 13 are formed of a transparent, inorganic material such as silicon nitride or silicon oxide. The fourth insulation film 14 is formed of a transparent, organic material such as a resin material.

The second common electrode CE2 and pixel electrodes PE are formed on the fourth insulation film 14 and are covered with the first alignment film AL1. The main pixel electrode PA is located between the second main common electrode CAL2 and second main common electrode CAR2, and is opposed to the first common electrode CE1 via the third insulation film 13 and fourth insulation film 14. The sub-pixel electrode PB is located between the second sub-common electrode CBU2 and second sub-common electrode CBB2, and is opposed to the first common electrode CE1 via the third insulation film 13 and fourth insulation film 14. The second main common electrode CAL2 is opposed to the source line S1 via the fourth insulation film 14. The second main common electrode CAR2 is opposed to the source line S2 via the fourth insulation film 14. The second sub-common electrode CBU2 is opposed, above the storage capacitance line C1, to the first common electrode CE1 via the third insulation film 13 and fourth insulation film 14. The second sub-common electrode CBB2 is opposed, above the storage capacitance line C2, to the first common electrode CE1 via the third insulation film 13 and fourth insulation film 14.

The first alignment film AL1 is disposed on that surface of the array substrate AR, which is opposed to the counter-substrate CT, and the first alignment film AL1 extends over substantially the entirety of the active area ACT. The first alignment film AL1 is also disposed on the fourth insulation film 14. The first alignment film AL1 is formed of, for example, a material which exhibits horizontal alignment properties.

The counter-substrate CT is formed by using a second insulative substrate 20 having light transmissivity. The counter-substrate CT includes a black matrix BM, color filters CF, an overcoat layer OC, a third common electrode CE3, and a second alignment film AL2, on the inside of the second insulative substrate 20, that is, on that side of the second insulative substrate 20, which is opposed to the array substrate AR.

The black matrix BM partitions each pixel PX, and forms an aperture portion AP which is opposed to the pixel electrode PE. Specifically, the black matrix BM is disposed so as to be opposed to wiring portions, such as the source lines S, storage capacitance lines C and switching element SW. In the example illustrated, the black matrix BM includes portions which are located above the source line S1 and source line S2 and extend in the second direction Y, and portions which are located above the storage capacitance line C1 and storage capacitance line C2 and extend in the first direction X, and the black matrix BM is formed in a grid shape. The black matrix BM is disposed on an inner surface 20A of the second insulative substrate 20, which is opposed to the array substrate AR.

The color filters CF are disposed in inside portions (aperture portions AP) partitioned by the black matrix BM on the inner surface 20A of the second insulative substrate 20, and parts of these color filters overlap the black matrix BM. The color filters CF, which are disposed in pixels PX neighboring in the first direction X, have mutually different colors. For example, the color filters CF are formed of resin materials which are colored in three primary colors of red, blue and green. A red color filter, which is formed of a red resin material, is disposed in association with a red pixel. A blue color filter, which is formed of a blue resin material, is disposed in association with a blue pixel. A green color filter, which is formed of a green resin material, is disposed in association with a green pixel. Incidentally, the color filters CF may further include a color filter of a color (e.g. transparent or white) which is different from the red, blue and green. The boundaries between the color filters CF are located at positions overlapping the black matrix BM. In addition, the color filter CF of each color extends over a plurality of pixels which neighbor in the second direction Y.

The overcoat layer CC covers the color filters CF. The overcoat layer CC is formed of, for example, a transparent resin material.

The third common electrode CE3 is disposed on that side of the overcoat layer CC, which is opposed to the array substrate AR, and is located below the black matrix BM. The third main common electrode CAL3 is opposed to the second main common electrode CAL2. The third main common electrode CAR3 is opposed to the second main common electrode CAR2. The third sub-common electrode CBU3 is opposed to the second sub-common electrode CBU2. The third sub-common electrode CBB3 is opposed to the second sub-common electrode CBB2. The third common electrode CE3 is formed of, for example, a transparent, electrically conductive material such as ITO or IZO. The third common electrode CE3 corresponds to a transparent electrode.

In the above-described aperture portion AP, in regions between the pixel electrode PE, on one hand, and the second common electrode CE2 and third common electrode CE3, on the other hand, excluding a region crossing the gate line G1, no other electrode or wiring is formed, and these regions correspond to transmissive regions through which backlight can pass.

The second alignment film AL2 is disposed on that surface of the counter-substrate CT, which is opposed to the array substrate AR, and the second alignment film AL2 extends over substantially the entirety of the active area ACT. The second alignment film AL2 covers the third common electrode CE3 and overcoat layer OC. The second alignment film AL2 is formed of, for example, a material which exhibits horizontal alignment properties.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the array substrate AR and the counter-substrate CT. Thereby, a predetermined cell gap is created between the first alignment film AL1 and second alignment film AL2. The cell gap is, for example, 2 to 7 μm. The array substrate AR and counter-substrate CT are attached by a sealant on the outside of the active area ACT in the state in which the predetermined cell gap is created therebetween.

The liquid crystal layer LQ is held between the array substrate AR and the counter-substrate CT, and is disposed between the first alignment film AL1 and second alignment film AL2. The liquid crystal layer LQ includes liquid crystal molecules LM. The liquid crystal layer LQ is composed of, for example, a liquid crystal material with a positive (positive-type) dielectric constant anisotropy.

A first optical element OD1 is attached to an outer surface 10B of the first insulative substrate 10. The first optical element OD1 is located on that side of the liquid crystal display panel LPN, which is opposed to the backlight unit BL, and controls the polarization state of incident light which enters the liquid crystal display panel LPN from the backlight unit BL. The first optical element OD1 includes a first polarizer PL1 having a first polarization axis AX1. In the meantime, another optical element, such as a retardation plate, may be disposed between the first polarizer PL1 and the first insulative substrate 10.

A second optical element OD2 is attached to an outer surface 20B of the second insulative substrate 20. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis AX2. In the meantime, another optical element, such as a retardation plate, may be disposed between the second polarizer PL2 and the second insulative substrate 20.

The first polarization axis AX1 and the second polarization axis AX2 have a substantially orthogonal positional relationship of crossed Nicols. In an example shown in part (a) of FIG. 4, the first polarizer PL1 is disposed such that the first polarization axis AX1 thereof is parallel to the first direction X, and the second polarizer PL2 is disposed such that the second polarization axis AX2 thereof is parallel to the second direction Y. In an example shown in part (b) of FIG. 4, the second polarizer PL2 is disposed such that the second polarization axis AX2 thereof is parallel to the first direction X, and the first polarizer PL1 is disposed such that the first polarization axis AX1 thereof is parallel to the second direction Y.

Next, the operation of the liquid crystal display panel LPN with the above-described structure is described.

Specifically, in a state in which no voltage is applied to the liquid crystal layer LQ, that is, in a state (OFF time) in which no electric field is produced between the pixel electrode PE and the common electrode CE (first common electrode CE1, second common electrode CE2 and third common electrode CE3), liquid crystal molecules LM of the liquid crystal layer LQ are initially aligned, as indicated by broken lines in FIG. 4, such that the major axes thereof are initially aligned substantially parallel to the second direction in the X-Y plane. This OFF time corresponds to the initial alignment state, and the alignment direction (the second direction Y in this example) of the liquid crystal molecules LM at the OFF time corresponds to the initial alignment direction.

At this OFF time, part of light from the backlight unit EL passes through the first polarizer PL1, and enters the liquid crystal display panel LPN. The light, which has entered the liquid crystal display panel LPN, is linearly polarized light which is perpendicular to the first polarization axis AX1 of the first polarizer PL1. The polarization state of linearly polarized light hardly varies when the light passes through the liquid crystal layer LQ at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which an electric field is produced between the pixel electrode PE and the common electrode CE, an electric field, which is substantially parallel to the substrate major surface, is produced between the pixel electrode PE and the second common electrode CE2, and an oblique electric field, which is inclined to the substrate major surface, is produced between the pixel electrode PE and the third common electrode CE3. The liquid crystal molecules LM are affected by the electric field between the pixel electrode PE and common electrode CE, and the polarization state thereof varies. In the example illustrated in FIG. 4, in the region between the pixel electrode PE and third main common electrode CAL3, the liquid crystal molecule LM in a lower-half region rotates clockwise relative to the second direction Y, and is aligned in a lower left direction in the Figure, and the liquid crystal molecule LM in an upper-half region rotates counterclockwise relative to the second direction Y, and is aligned in an upper left direction in the Figure. In the region between the pixel electrode PE and third main common electrode CAR3, the liquid crystal molecule LM in a lower-half region rotates counterclockwise relative to the second direction Y, and is aligned in a lower right direction in the Figure, and the liquid crystal molecule LM in an upper-half region rotates clockwise relative to the second direction Y, and is aligned in an upper right direction in the Figure. In this manner, in each pixel PX, the liquid crystal molecules LM at the ON time are aligned in a plurality of directions, with boundaries at positions overlapping the pixel electrode PE, and domains are formed in the respective alignment directions. Specifically, a plurality of domains are formed in one pixel PX. Thereby, in the pixel PX, transmissive regions, through which backlight can pass, are formed between the pixel electrode PE and the common electrode CE.

At this ON time, the polarization state of linearly polarized light, which has entered the liquid crystal display panel LPN, varies depending on the alignment state of the liquid crystal molecules LM when the light passes through the liquid crystal layer LQ. Thus, at the ON time, at least part of the light emerging from the liquid crystal layer LQ passes through the second polarizer PL2 (white display). However, at a position overlapping the pixel electrode PE and common electrode CE, since the liquid crystal molecules LM are kept in the initial alignment state, black display is effected, like the case of the OFF time.

In the meantime, at the ON time, the semiconductor layer SC of the switching element SW is opposed to the storage capacitance line C1 via the insulation film 11, and maintains, for a predetermined period, the pixel potential that is written in each pixel.

According to the present embodiment, the first common electrode CE1 of the common potential lies between the source line S1 and the second extension portion E2 of the semiconductor layer SC. It is thus possible to suppress capacitive coupling between the semiconductor layer SC and the source line S1. In particular, since it is possible to suppress capacitive coupling with the source line S1 on the side of the drain region SCD that is in contact with the pixel electrode PE in the semiconductor layer SC, the pixel potential can be kept constant regardless of the potential of the video signal that is supplied to the source line S1. Thus, degradation in display quality due to crosstalk can be suppressed in the respective pixels which are electrically connected to the same source line.

In addition, even when such a driving method is applied that the polarity of a video signal, which is supplied to each source line, is reversed on a frame-by-frame basis, the capacitive coupling between the semiconductor layer and the source line can be suppressed, and therefore the degradation in display quality can be suppressed.

According to the present embodiment, the first common electrode CE1 is opposed to the gate line G. It is thus possible to shield an undesired leak electric field occurring from the gate line G toward the liquid crystal layer LQ. Accordingly, it is possible to reduce the effect of an undesired electric field in that region of the transmissive regions, which is close to the gate line G, and to improve display quality.

Additionally, the array substrate AR includes the first common electrode CE1 on the first insulative substrate 10 side of each source line S, and includes the second main common electrode CA2 (corresponding to the second main common electrodes CAL2 and CAR2 in the above example) on the liquid crystal layer LQ side of each source line S. Since the first common electrode CE1 and second main common electrode CA2 have the same potential, an equipotential surface is formed between the first common electrode CE1 and second main common electrode CA2. This equipotential surface shields an undesired leak electric field occurring from the source line S, which is located between the first common electrode CE1 and the second main common electrode CA2, toward the liquid crystal layer LQ. Accordingly, it is possible to reduce the effect of an undesired electric field in that region of the transmissive regions, which is close to the source line S, and to improve display quality.

According to the present embodiment, the third common electrode CE3 has the grid shape facing the second common electrode CE2, and has the same potential as the second common electrode CE2. Thus, an equipotential surface is formed between the second common electrode CE2 and third common electrode CE3. This equipotential surface keeps the liquid crystal molecules LM in the initial alignment state at the ON time and OFF time, even if misalignment occurs between the array substrate AR and counter-substrate CT. Therefore, the occurrence of color mixture can be suppressed.

In the meantime, the sub-pixel electrode PB of the pixel electrode PE has a function of producing an electric field for dividing the alignment directions of liquid crystal molecules within one pixel. This sub-pixel electrode PB is formed to have a size (the length in the first direction X and the length in the second direction Y) that is necessary for producing such an electric field. In the example illustrated in FIG. 2, etc., the sub-pixel electrode PB can be thinned to a width which is equal to the width of the gate line G1. In addition, the semiconductor layer SC is disposed in a region which, inherently, does not contribute to display and overlaps the source line S or gate line G. Thereby, the area of the transmissive region per pixel can be increased, and the transmittance can be enhanced.

Next, modifications of the present embodiment will be described. In the description below, main different points will be described, and the same structures as in the above-described examples are denoted by like reference numerals, and a detailed description thereof is omitted.

Figure 7:
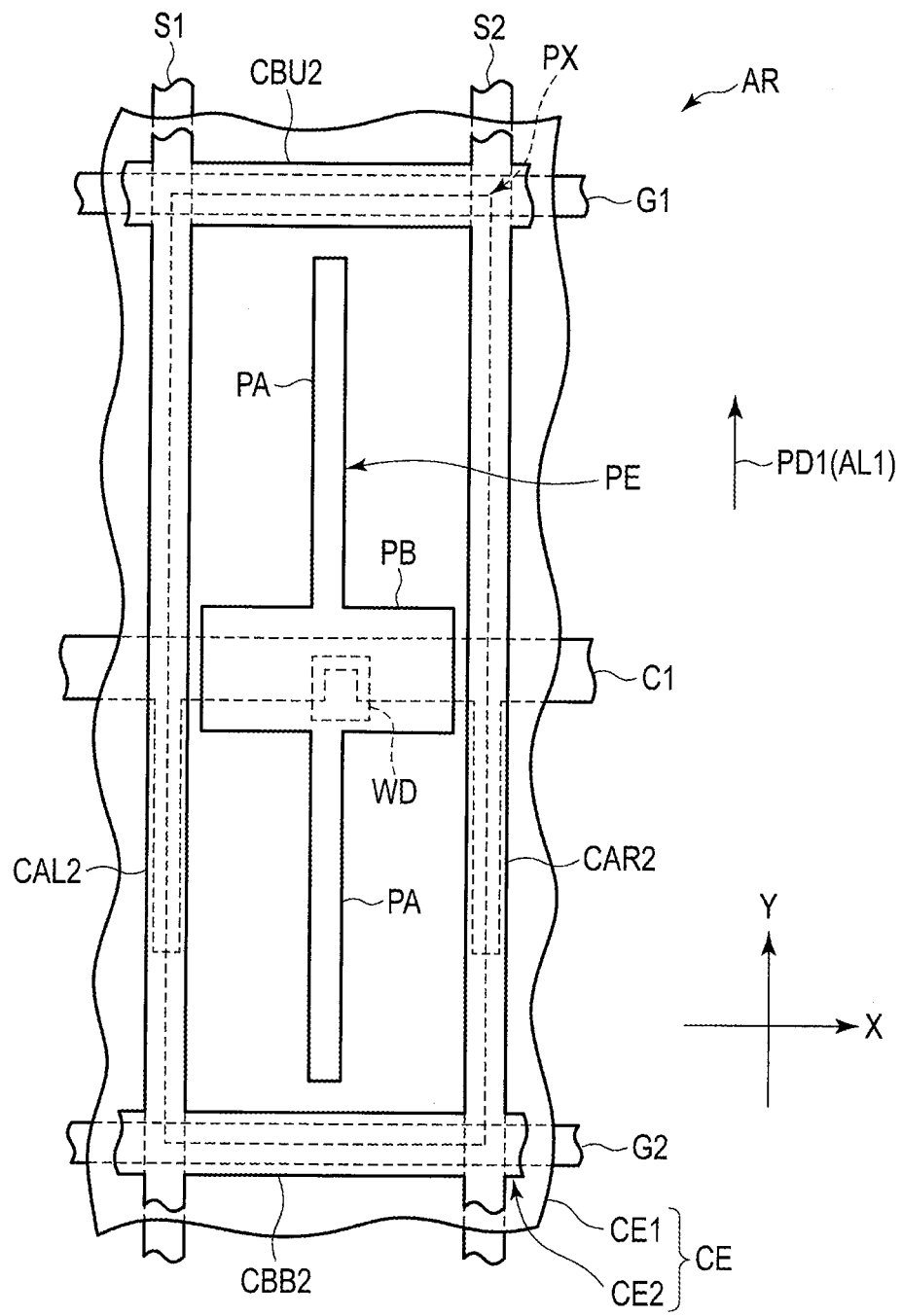
FIG. 7 is a plan view which schematically illustrates another structure example of the pixel PX at a time when the array substrate AR illustrated in FIG. 1 is viewed from the counter-substrate side.

FIG. 7 is a plan view which schematically illustrates another structure example of the pixel PX at a time when the array substrate AR illustrated in FIG. 1 is viewed from the counter-substrate side.

The example illustrated in FIG. 7 differs from the example illustrated in FIG. 2 in that the storage capacitance line C1 is disposed at a substantially middle portion of the pixel PX, and is located between the gate line G1 and gate line G2.

Specifically, the gate line G1 and gate line G2 are disposed at an interval in the second direction Y, and each of the gate line G1 and gate line G2 extends in the first direction X. The storage capacitance line C1 is located at a substantially middle point between the gate line G1 and gate line G2, and extends in the first direction X.

As indicated by a broken line in FIG. 7, the pixel PX illustrated corresponds to a box-shaped area which is defined by the gate line G1 and gate line G2 and the source line S1 and source line S2. The length of the pixel PX in the second direction Y corresponds to the pitch between the gate line G1 and gate line G2 in the second direction Y. The gate line G1 is located at the upper side end portion, and is disposed to extend over a boundary between the pixel PX and a pixel neighboring on the upper side, and the gate line G2 is located at the lower side end portion, and is disposed to extend over a boundary between the pixel PX and a pixel neighboring on the lower side.

The main pixel electrode PA of the pixel electrode PE is located at a substantially middle point between the source line S1 and source line S2, and linearly extends in the second direction Y to the vicinity of the upper side end portion of the pixel PX (i.e. to the vicinity of the gate line G1) and to the vicinity of the lower side end portion of the pixel PX (i.e. to the vicinity of the gate line G2).

The first common electrode CE1 is disposed over substantially the entirety of the pixel PX, extends in the first direction X beyond the source line S1 and source line S2, and extends in the second direction Y beyond the gate line G1 and gate line G2.

The second sub-common electrode CBU2 of the second common electrode CE2 is located at an upper side end portion of the pixel PX above the gate line G1, and is disposed to extend over a boundary between the pixel PX and a pixel neighboring on the upper side. The second sub-common electrode CBB2 is located at a lower side end portion of the pixel PX above the gate line G2, and is disposed to extend over a boundary between the pixel PX and a pixel neighboring on the lower side.

Figure 8:
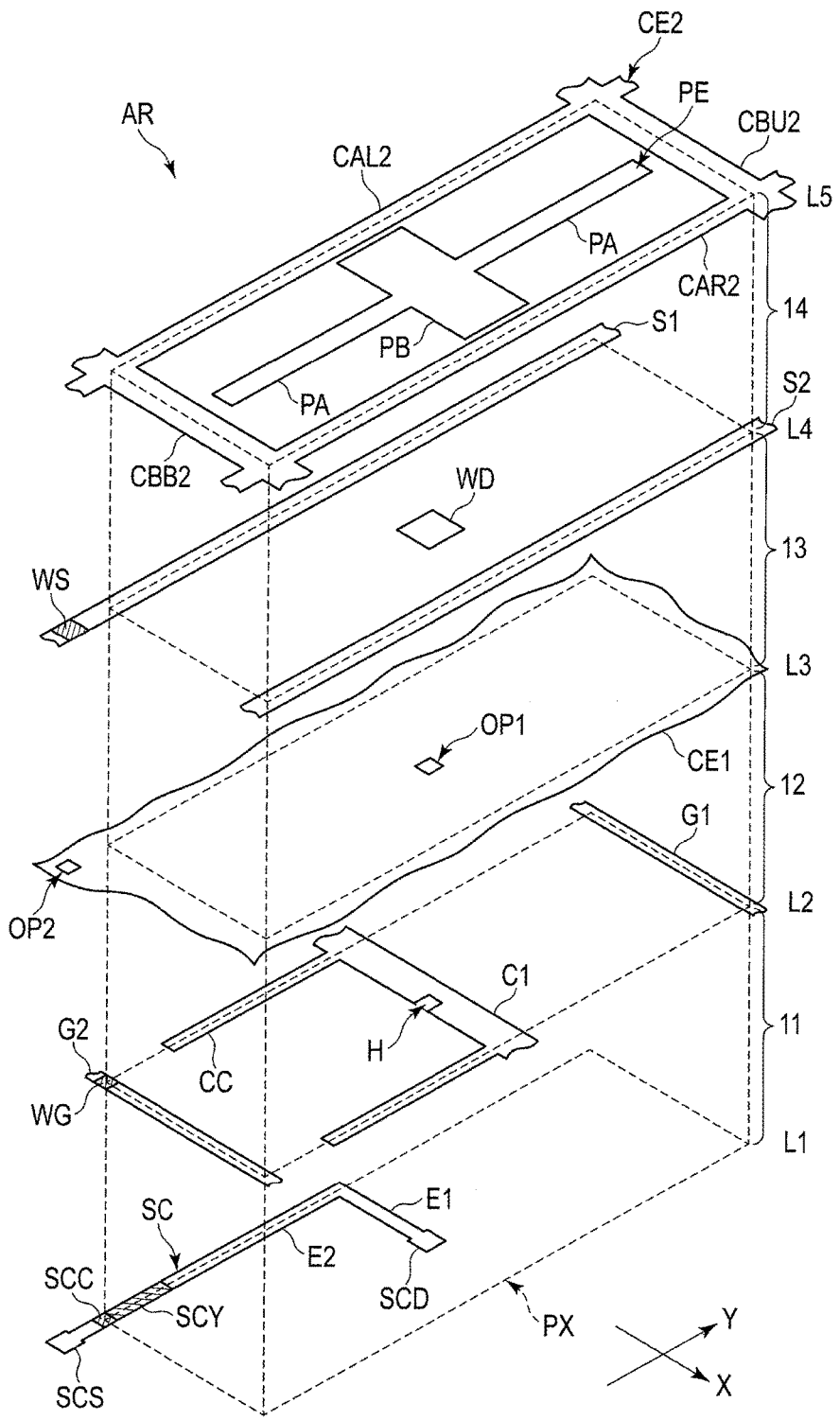
FIG. 8 is an exploded view which schematically illustrates a main layer structure constituting the array substrate AR shown in FIG. 7.

FIG. 8 is an exploded view which schematically illustrates a main layer structure constituting the array substrate AR shown in FIG. 7.

In the first layer L1, the semiconductor layer SC includes a first extension portion E1 extending in the first direction X, and a second extension portion E2 extending in the second direction Y. The second extension portion E2 extends below the source line S1, crosses the gate line G2, and extends toward the storage capacitance line C1. The first extension portion E1 is continuous with one end portion of the second extension portion E2, and extends below the drain electrode WD and storage capacitance line C1. In the meantime, in the semiconductor layer SC, a region located immediately below the gate line G2 corresponds to a channel region SCC, a region on a side of contact with the source line S1, relative to the channel region SCC, corresponds to a source region SCS, and a region on a side of extension below the drain electrode WD, relative to the channel region SCC, corresponds to a drain region SCD.

In the second layer L2, a main portion of the storage capacitance line C1 extends in the first direction X, and is opposed to the first extension portion E1 via the first insulation film 11. Incidentally, the main portion of the storage capacitance line C1 includes an opening portion H at a position opposed to an end portion (drain region SCD) of the first extension portion E1. A branch portion CC of the storage capacitance line C1 extends towards the gate line G2 in the second direction Y, and is opposed to the second extension portion E2 via the first insulation film 11. Of the gate line G2, a region located above the semiconductor layer SC corresponds to the gate electrode WG of the switching element.

In the third layer L3, the first common electrode CE1 is opposed to the storage capacitance line C1, gate line G1 and gate line G2. In addition, the first common electrode CE1 is opposed to the semiconductor layer SC between the gate line G2 and storage capacitance line C1.

In the fourth layer L4, that region of the source line S1, which is in contact with the source region SCS of the semiconductor layer SC, corresponds to the source electrode WS of the switching element. Although the source line S1 is located above the second extension portion E2 of the semiconductor layer SC, the first common electrode CE1 lies between the source line S1 and a region SCY of the second extension portion E2, which is located on the side of the drain region SCD that is in contact with the pixel electrode PE.

In this example, too, since the first common electrode CE1 of the common potential lies between the source line S1 and the second extension portion E2 of the semiconductor layer SC, it is possible to suppress capacitive coupling between the semiconductor layer SC and the source line S1. Therefore, the same advantageous effects as in the above-described example can be obtained.

Figure 9:
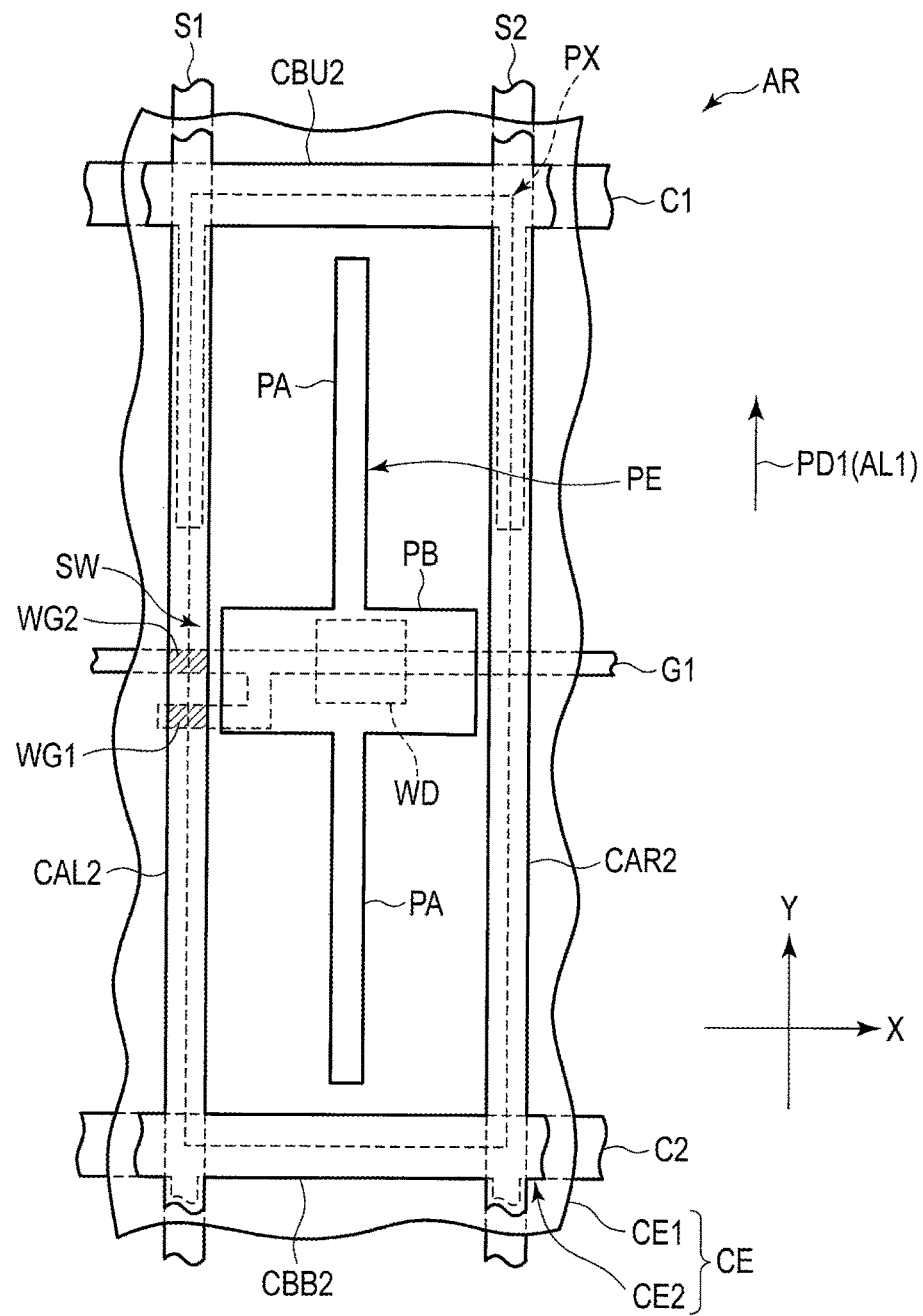
FIG. 9 is a plan view which schematically illustrates still another structure example of the pixel PX at a time when the array substrate AR illustrated in FIG. 1 is viewed from the counter-substrate side.

FIG. 9 is a plan view which schematically illustrates still another structure example of the pixel PX at a time when the array substrate AR illustrated in FIG. 1 is viewed from the counter-substrate side.

The example illustrated in FIG. 9 differs from the example illustrated in FIG. 2 in that the gate line G1 is branched at an intermediate part thereof, and a gate electrode WG1 and a gate electrode WG2 of the switching element SW are provided. In short, the switching element SW of the illustrated example has a double-gate structure.

FIG. 10 is an exploded view which schematically illustrates a main layer structure constituting the array substrate AR shown in FIG. 9.

In the first layer L1, the second extension portion E2 extends below the source line S1, crosses the gate line G1 at two locations, and extends toward the storage capacitance line C1. In the semiconductor layer SC, a region located immediately below the gate electrode WG1 of the gate line G1 corresponds to a channel region SCC1, a region located immediately below the gate electrode WG2 of the gate line G1 corresponds to a channel region SCC2, and a region on a side of extension below the drain electrode WD, relative to the channel region SCC2, corresponds to a drain region SCD.

In the fourth layer L4, although the source line S1 is located above the second extension portion E2 of the semiconductor layer SC, the first common electrode CE1 lies between the source line S1 and a region SCY of the second extension portion E2 on the side of the drain region SCD that is in contact with the pixel electrode PE.

In this example, too, the same advantageous effects as in the above example can be obtained. Furthermore, since the switching element of the double-gate structure is applied, a leak current can be reduced.

In the meantime, in the above-described embodiment, the example was described in which the alignment of liquid crystal molecules is controlled by the interaction between the electric field which is produced between the pixel electrode PE and second common electrode CE2 and the electric field which is produced between the pixel electrode PE and third common electrode CE3. However, the embodiment is not limited to this example. For example, the third common electrode CE3 may be omitted from the liquid crystal display panel LPN, and the alignment of liquid crystal molecules may be controlled by the electric field which is produced between the pixel electrode PE and second common electrode CE2.

As has been described above, according to the present embodiment, a display device which can improve display quality can be provided.

The display device of the present embodiment may be constituted by an organic electroluminescence (EL) display device, a display device utilizing a microelectromechanical system, a display device utilizing electrochromism, etc.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate including a first insulation substrate, a polycrystalline silicon layer, a gate line extending in a first direction, a source line extending in a second direction, a transparent conductive layer formed of indium tin oxide (ITO) or indium zinc oxide (IZO), a first insulation film, and a second insulation film, a third insulation film, and a plurality of pixel electrodes which are arrayed in a matrix in an active area,
wherein
the polycrystalline silicon layer is disposed on the first insulation substrate and is directly covered by a bottom surface of the third insulation film,
the gate line is disposed on a top surface of the third insulation film,
the transparent conductive layer is sandwiched between a top surface of the first insulation film and a bottom surface of the second insulation film,
a bottom surface of the first insulation film directly covers the gate line,
the source line is directly disposed on a top surface of the second insulation film, and
the polycrystalline silicon layer is electrically connected to one of the plurality of pixel electrodes via an opening portion of the transparent conductive layer.

2. The display device according to claim 1, wherein the transparent conductive layer is opposed to the plurality of pixel electrodes.

3. The display device according to claim 1, wherein the transparent conductive layer is opposed to the gate line and the source line.

4. The display device according to claim 2, wherein the transparent conductive layer is opposed to the gate line and the source line.

5. The display device according to claim 4, wherein the transparent conductive layer has a common potential.

6. The display device according to claim 1, wherein
the first substrate further includes a drain electrode disposed on the top surface of the second insulation film, and
the drain electrode is opposed to the opening portion of the transparent conductive layer.

7. The display device according to claim 6, wherein
the first substrate further includes a metal wiring extending on the top surface of the third insulation film in the first direction, and
the metal wiring is opposed to the transparent conductive layer.

8. The display device according to claim 6, wherein
the first substrate further includes a common line extending in the second direction, and
the common line is opposed to the source line and electrically connected to the transparent conductive layer.

9. The display device according to claim 8, wherein
the first substrate further includes a fourth insulation film,
a bottom surface of the fourth insulation film directly covers the source line, and
the common line is disposed on a top surface of the fourth insulation film.

10. The display device according to claim 7, wherein
the first substrate further includes a common line extending in the first direction, and
the common line is opposed to the metal wiring and electrically connected to the transparent conductive layer.

11. The display device according to claim 10, wherein
the first substrate further includes a fourth insulation film,
a bottom surface of the fourth insulation film directly covers the source line, and
the common line is disposed on a top surface of the fourth insulation film.

12. The display device according to claim 1, wherein
the source line includes a source electrode,
the polycrystalline silicon layer is opposed to the source electrode via an opening portion of the transparent conductive layer.

13. The display device according to claim 1, wherein the first insulation film and the second insulation film are formed of an inorganic material.

14. The display device according to claim 1, wherein the first, second, and third insulation films are formed of an inorganic material.

15. The display device according to claim 8, wherein the source line is disposed between the common line and the transparent conductive layer.

16. The display device according to claim 10, wherein the transparent conductive layer is disposed between the common line and the gate line.

* * * * *